United States Patent
Kopacek et al.

(10) Patent No.: US 8,689,536 B2
(45) Date of Patent: Apr. 8, 2014

(54) ADVANCED LASER IGNITION SYSTEMS FOR GAS TURBINES INCLUDING AIRCRAFT ENGINES

(75) Inventors: Herbert Kopacek, Schwaz (AT); Sara Rocci Denis, Garching dei Munich (DE); Keith Robert McManus, Clifton Park, NY (US); Michael Breit, Ismaning (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/956,191

(22) Filed: Nov. 30, 2010

(65) Prior Publication Data
US 2012/0131926 A1 May 31, 2012

(51) Int. Cl.
F02C 7/264 (2006.01)

(52) U.S. Cl.
USPC .......................... 60/39.821; 60/776; 356/317

(58) Field of Classification Search
USPC .................. 60/39.821, 39.827, 776, 39.281; 356/72, 317; 123/143
See application file for complete search history.

(56) References Cited

U.S. PATENT DOCUMENTS

| | | | | |
|---|---|---|---|---|
| 3,215,838 A | * | 11/1965 | Schultz | 250/394 |
| 3,427,118 A | * | 2/1969 | Kuchelbacher et al. | 431/258 |
| 3,473,879 A | * | 10/1969 | Berberich | 431/1 |
| 4,302,933 A | * | 12/1981 | Smith | 60/761 |
| 4,947,640 A | * | 8/1990 | Few et al. | 60/776 |
| 5,367,869 A | * | 11/1994 | DeFreitas | 60/776 |
| 5,432,090 A | * | 7/1995 | Tanaka et al. | 436/79 |
| 5,497,612 A | * | 3/1996 | Few et al. | 60/776 |
| 5,673,554 A | * | 10/1997 | DeFreitas et al. | 60/39.821 |
| 5,756,924 A | | 5/1998 | Early | |
| 5,876,195 A | * | 3/1999 | Early | 431/11 |
| 7,340,129 B2 | | 3/2008 | Yalin et al. | |
| 7,420,662 B2 | * | 9/2008 | Yalin et al. | 356/72 |
| 7,421,166 B1 | | 9/2008 | Woodruff et al. | |
| 8,127,732 B2 | * | 3/2012 | Kopecek et al. | 123/143 B |
| 2008/0289342 A1 | * | 11/2008 | Sappey et al. | 60/793 |
| 2009/0282805 A1 | | 11/2009 | Kopecek et al. | |
| 2010/0031909 A1 | | 2/2010 | Herden et al. | |
| 2011/0239621 A1 | * | 10/2011 | Meneely et al. | 60/39.281 |

FOREIGN PATENT DOCUMENTS

EP 1 816 398 A1 8/2007
WO 9811388 A1 3/1999

OTHER PUBLICATIONS

Herbert Kopecek, Soren Charareh, Maxmilian Lackner, Christian Forsich, Franz Winter, Johann Klausner, Gunther Herdin, Martin Weinrotter and Ernst Wintner, Laser Ignition of Methane-Air Mixtures at High Pressures and Diagnostics, J. Eng. Gas Turbines Power, Jan. 205, vol. 127, Issue 1, pp. 213-219, 7 pages.
Herbert Kopecek, et al.; "Laser Ignition System and Method for Internal Combustion Engine"; Pending U.S. Appl. No. 12/488,761, filed Jun. 22, 2009; 20 pages.
Search Report and Written Opinion from corresponding EP Application No. 11190420.7-1267 dated Mar. 12, 2012.

* cited by examiner

*Primary Examiner* — William H Rodriguez
*Assistant Examiner* — Carlos A Rivera
(74) *Attorney, Agent, or Firm* — Scott J. Asmus

(57) ABSTRACT

A laser ignition system for an internal combustion engine, and more specifically a gas turbine engine, is provided. The system comprises at least one laser light source configured to generate a laser beam and an optical beam guidance component. The optical beam guidance component is configured to transmit the laser beam to irradiate on an oxygenated fuel mixture supplied into the combustion chamber at a region of highest ignitability to generate a combustor flame in a flame region. The system further includes an integrated control diagnostic component configured to detect at least a portion of a light emission and operable to control one or more combustion parameters based in part on the detected light emission. The system further includes additional enhanced ignition control configurations. A method for igniting a fuel mixture in an internal combustion engine is also presented.

28 Claims, 13 Drawing Sheets

ADVANCED LASER IGNITION SYSTEMS FOR GAS TURBINES INCLUDING AIRCRAFT ENGINES

BACKGROUND

This invention relates generally to ignition systems for internal combustion engines. More particularly, this invention relates to laser ignition systems and features that optimize a laser ignition system for internal combustion engines.

For internal combustion engines, fuel is combusted with an oxidizer (usually air) in combustion chambers. The resulting high temperature and pressure gases expand and thereby apply forces to movable components of the engines, such as turbine blades to drive the turbine. Combustion can be intermittent (as for example, in automotive applications) or continuous (as for example, in gas turbines and jet engines).

In a conventional ignition apparatus for internal combustion engines, a high voltage is applied to an ignition plug that is fixed on a wall surface of the combustion chamber in order to ignite an air-fuel mixture by spark discharge. However, in an ignition apparatus of this kind, since the ignition plug is exposed directly to the combustion chamber, carbon attaches to the ignition plug to render the discharge of the ignition plug difficult. Furthermore, due to a heat loss of the electrodes of the ignition plug, a torch or nucleus of flame generated by the discharge is cooled, and vanishes before reaching a flame. Additionally, since the ignition occurs on or very near the wall surface, poor mixing often results due to the difficulties associated with burning fuel from the wall surface.

Engines that use combustible fuel such as, for example, gas turbine engines and other internal combustion engines include combustion areas such as, for example, combustors or cylinder and piston assemblies that facilitate the conversion of energy from combustion into mechanical energy. Fuel nozzles are used to introduce atomized fuel into the combustion areas. The atomized fuel is ignited by an igniter. Igniters may include, for example, electrical igniters that create a spark proximate to the atomized fuel, heating elements that introduce heat to the atomized fuel, and igniters that introduce a flame in the combustion area. In an attempt to enhance mixing and flame stabilization, optimizing this laser assisted atomization and pre-ionization by the laser light is desired.

In addition, in conventional diagnostics system for internal combustion engines, optical measurements of flame chemiluminescent light emissions are routinely used in premixed gas combustors to determine various parameters such as energy or heat release rates and fuel-to-air ratios in such combustors. Placing wavelength filters in front of optical detectors is typically used to identify the partial contribution of the total light emission from each of specific excited-state species. Ratios of the signals of one or more of these species can then be correlated in a known manner to various combustor parameters such as the fuel-to-air ratio, heat release rate and gas temperature. Previous applications of this measurement technique have used simple optical sensor arrangements and camera systems.

Typically, the ignition apparatus and the diagnostics apparatus are formed as separate systems that utilize separate and discrete components within a combustion engine. However, results can be improved by providing for optimized ignition configurations and diagnostics using optical techniques in each combustor can.

Therefore, there is a need for a new and improved optimized ignition system and method for internal combustion engines in which an optimized laser ignition is provided in an attempt to enhance mixing and flame stabilization in combination with an integrated diagnostics apparatus.

BRIEF DESCRIPTION

A laser ignition system for an internal combustion engine is provided in accordance with one embodiment of the invention. The laser ignition system including at least one laser light source configured to generate a laser beam; and an optical beam guidance component configured to transmit the laser beam to irradiate on an oxygenated fuel mixture supplied into the combustion chamber at a region of highest ignitability to generate a combustor flame in a flame region.

Another embodiment of the invention is directed to a method for igniting a fuel mixture in an internal combustion engine. The method including generating at least one laser beam with at least one laser light source; transmitting the at least one laser beam through at least one optical beam guidance component to focus the at least one laser beam on the fuel mixture supplied into a combustion chamber of the internal combustion engine at a region of highest ignitability; and igniting the fuel mixture with the focused laser beam to generate a combustor flame in a flame region.

These and other advantages and features will be better understood from the following detailed description of preferred embodiments of the invention that is provided in connection with the accompanying drawings.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

Embodiments of the present disclosure are described herein with reference to the accompanying drawings. In the subsequent description, well-known functions or constructions are not described in detail to avoid obscuring the disclosure in unnecessary detail.

Figure 1:
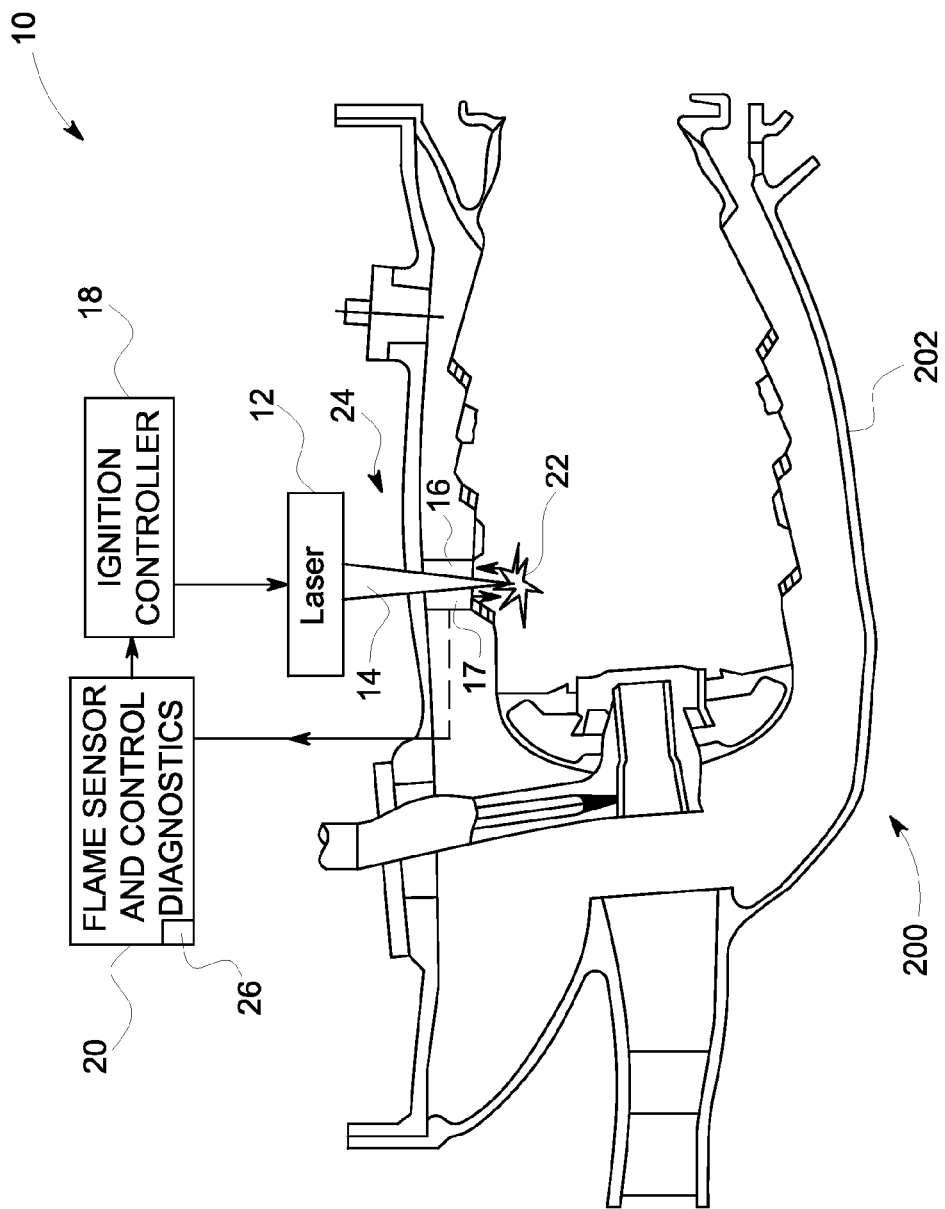
FIG. 1 is a schematic diagram of a gas turbine including a laser ignition system in accordance with one embodiment.

FIG. 1 illustrates a schematic diagram of an enhanced laser ignition system 10 in accordance with one embodiment of the invention. In embodiments of the invention, the laser ignition system 10 is configured to generate and guide a laser beam to focus into a chamber, such as a combustion chamber 202 of an internal combustion engine 200, such as a gas turbine engine 201, to ignite combustive mediums, such as an oxygenated fuel mixture therein. In addition, the laser ignition system is configured to provide emission diagnostics to detect ignition and flame out and assess local mixture composition, flame propagation and emissions within the combustion chamber 202. As used herein, the phrase "internal combustion engine" encompasses engines with continuous combustion and engines with intermittent combustion. Non-limiting examples of the internal combustion engine 200 includes a reciprocating engine, a gas turbine engine, a jet engine, a diesel engine, and a rotary engine.

As illustrated in FIG. 1, the laser ignition system 10 comprises the at least one laser light source 12 configured to generate a laser beam 14 and an optical beam guidance component 16 in optical communication with the at least one laser light source 12 and configured to provide dual purposes: (i) guide the laser beam 14 from the at least one laser light source 12 to focus into the combustion chamber 202 of the internal combustion engine 200 to provide enhanced ignition; and (ii) transmit an emission from a generated flame for flame diagnostic purposes. Further, the laser ignition system 10 comprises an ignition controller 18 coupled to the at least one laser light source 12 to control the generation of the laser beam 14 from the at least one laser light source 12 and a flame sensor and control diagnostics 20 for detecting the transmitted emission of the combustor flame and controlling combustion parameters associated with the laser beam 14.

In the illustrated arrangement, the ignition controller 18 is separated from the at least one laser light source 12. Alternatively, the ignition controller 18 may be integral with the at least one laser light source 12. It should be noted that this disclosure is not limited to any particular controller for performing the processing tasks of the invention. The term "controller", as that term is used herein, is intended to denote any machine capable of performing the calculations, or computations, necessary to perform the tasks of the invention. The term "controller" is intended to denote any machine that is capable of accepting a structured input and of processing the input in accordance with prescribed rules to produce an output, as will be understood by those skilled in the art. In addition, the ignition controller 18 may provide power to the at least one laser light source 12.

In some applications, the ignition controller 18 may accept ignition requests from pilots and/or be operated based on engine operational parameters, such as crank angles, speeds, engine operational temperatures, accelerator positions, exhaust quality, and measured fuel variables, etc. Accordingly, in some examples, one or more detection units, such as photodetectors (not shown) know in the art may be provided to sense the operational parameters of the internal combustion engine 200, and may relay corresponding information to the ignition controller 18 to control the generation and/or the focusing of the laser beam 14.

In one non-limiting example, the ignition controller 18 may include a laser control circuit and/or an ignition timing control circuit. As is known in the art, the laser control circuit may synchronize laser oscillations with the ignition timing. The ignition timing control circuit may include a control circuit that includes an ignition timing calculating circuit that calculates the ignition timing based on detected engine operational conditions. Further description of such example control units may be found in U.S. Pat. No. 4,416,226, entitled "Laser ignition apparatus for an internal combustion engine," which is assigned to the same assignee and incorporated by reference herein. In certain applications, an Electronic Control Unit (ECU) may be used as the ignition controller 18, or in conjunction with the ignition controller 18.

In some embodiments, the at least one laser light source 12 may be any laser apparatus know in the art that is capable of emitting sufficient energy, so that the energy may focus into the combustion chamber 202 of the internal combustion engine 200 to ignite the combustive mediums, such as fuel, fuel-air mixtures or premixed mixtures therein. Examples of the at least one laser light source 12 include, but are not limited to, Neodymium-type lasers, Erbium-type lasers, other solid-state lasers, or other suitable lasers such as semiconductor lasers.

In some embodiments, the laser ignition process may take place by any one or combination of at least three ignition mechanisms including, but not limited to, photochemical ignition, thermal ignition, and laser-induced spark ignition. In photochemical ignition, laser photons dissociate target molecules, such as the fuel or fuel-air mixtures, into highly reactive radical species. These radicals then initiate a rapid chemical chain reaction, or combustion. As is known in the art, photochemical ignition requires a close match between the laser excitation wavelength and the target molecule's absorption wavelength in order for dissociation to occur.

Thermal ignition uses a laser to increase kinetic energy, in translational, rational, or vibrational form, of target molecules. As a result, molecular bonds are broken and chemical reactions can take place. This mechanism may be used to ignite combustibles in combinations of solid, liquid, and gas phases. Heating of the material with this technique may be performed with infrared lasers.

In laser-induced spark ignition, a laser beam is focused to create a plasma kernel, or spark. Such spark emits light, heat, and a shock wave to the surrounding medium, supplying energy to initiate combustion. The laser-induced spark ignition may primarily constitute a thermal chemical process, in which the heat generated in both the laser spark and the shock wave is used for ignition.

As depicted in FIG. 1, the optical beam guidance component 16 is disposed on the internal combustion engine 200 and is in communication with the combustion chamber 202. More particularly, the optical beam guidance component 16 may be positioned in a combustor wall of the combustion chamber 202 and may include an optical window (described presently). The laser beam 14 from the at least one laser light source 12 may pass through the optical beam guidance component 16 and may be focused, imaged, or transformed by one or more optics 17, such as one or more lenses, prisms, or the like, housed within the optical beam guidance component 16.

According to example embodiments of the invention, the one or more optics 17 may be moveable in order to focus and/or steer the laser beam 14. Thus, the laser beam 14 from the at least one laser light source 12 may be guided and focused by the optical beam guidance component 16 into the combustion chamber 202 to ignite the fuel and fuel-air mixtures therein.

The laser ignition system 10 illustrated in FIG. 1 further includes a means in which combustion parameters are measured in the combustion chamber 202 of the internal combustion engine 200 by selectively detecting spatial, temporal, and/or spectral light emissions from combustor burner flames. More specifically, the flame sensor and control diagnostic component 20, in response to a transmitted light emission from the optical beam guidance component 16, is operable to control one or more combustion parameters. According to embodiments of the invention, the measured combustion parameters may in turn be utilized to control various parameters of the internal combustion engine 200, including, but not limited to fuel flow rates, fuel/air ratios, and fuel flow distributions to optimize nitrous oxide emissions, dynamic pressure oscillations, and fuel efficiencies, air/fuel ratio, combustion flame oscillations, combustion flame extinction, heat release ratio, or flame temperature.

According to example embodiments of the invention, chemiluminescence emissions from one or more flames in the internal combustion engine 200 may be monitored using one or more optical detectors formed as a part of the flame sensor and control diagnostics 20. The light energy emissions received via the optical beam guidance component 16 may be spectrally filtered to identify the partial contribution of the total light emission from specific excited-state species such as OH*, CH*, C2* and CO2*. Ratios of these measured signals may be correlated to the fuel-to-air ratio, heat release rate, and temperature. According to example embodiments, the time-resolved output from optical detectors may be analyzed to reveal unsteady phenomena associated with the combustion, and may be used to indicate combustion-acoustic oscillations (combustion dynamics), incipient flame blowout, and flame extinction. In addition, the output signals may be used as feedback for use in a closed-loop combustion control system (described presently). Various sensor options and configurations for combustion control applications, according to embodiments of the invention, will be described with reference to the accompanying figures.

FIG. 1 illustrates the laser ignition system 10 as including the flame sensor and control diagnostics 20 for controlling combustion parameters associated with the combustion chamber 202 of the internal combustion engine 200, according to an example embodiment of the invention. In the illustrated arrangement, the flame sensor and control diagnostics 20 may be placed or mounted adjacent to the combustion chamber 202 and formed separate from the ignition controller 18 (as illustrated). Alternatively, the flame sensor and control diagnostics 20 may be integral with the ignition controller 18 and/or the at least one laser light source 12. The flame sensor and control diagnostics 20 may selectively detect light emission from flames 22 within the combustion chamber 202 near a flame region 24 of the combustion chamber 202. The light emission from at least a portion of the flames 22 may pass through the optical beam guidance component 16 and may be focused, imaged, or transformed by the one or more optics 17. According to example embodiments of the invention, and as previously described, the one or more optics 17 may be moveable to vary the optical system field of view.

According to an example embodiment of the invention, and with continued reference to FIG. 1, the flame sensor and control diagnostics 20 may further include at least one optical detector 26 selected for its response within wavelength spectra windows of interest. For example, a silicon carbide (SiC) photo detector may be selected because of its sensitivity to the ultra violet portion of the wavelength spectrum, and therefore, may be suitable for sensing the emission from the excited state OH* radical in the 300 nm wavelength range. The OH* emission can be a primary indicator of chemical reaction intensity (heat release) and therefore, wavelengths in the 300 nm region may be used to determine gas temperature. According to another embodiment, a silicon (Si) photo detector may be utilized for monitoring the emission from chemical species in the 400 to 1000 nm spectrum including CH* (about 430 nm) and C2*(about 514 nm). These flame radicals have been found to be proportional to heat release and local fuel-to-air ratio in pre-mixed flames. According to an example embodiment, associated detector electronics within the flame sensor and control diagnostics 20 may be operable to condition, amplify, filter, and process the signals from the at least one optical detector 26. The detector electronics may also provide control positioning component optics within the optical beam guidance component 16, including the optics 17. The output signal from the detector electronics may be used as a control signal for the flame sensor and control diagnostics system 20 and the ignition controller 16. For example, according to an embodiment of the invention, the measured ratio of CH to OH chemiluminescence (CH*/OH*) may be utilized as feedback in the flame sensor and control diagnostics 20, and may provide a control to dynamically adjust the fuel/air ratio. Further description of such example combustion control diagnostics may be found in U.S. pending patent application bearing Ser. No. 12/484,447, entitled "Optical Sensors for Combustion Control," which is assigned to the same assignee and incorporated by reference herein.

Referring now to FIGS. 2-5, illustrated in schematic diagrams is a laser ignition system in accordance with embodiments. For ease of illustration, the same numerals may be used to indicate similar elements in the figures. It should be noted that depicted arrangements in FIGS. 2-5 are merely illustrative. Illustrated in FIGS. 2-5 are laser ignition systems 30 and 34, respectively, configured generally similar to the laser ignition 10, described in reference to FIG. 1 and having a port formed in the combustor sidewall through which the laser beam 14 passes positioned at a different locations on the combustor wall to illustrate different optical focusing measures between the two embodiments.

In the depicted embodiments, provided are a plurality of fuel nozzles 28, of which only one is shown, in the internal combustion engine 200 (FIG. 1). The fuel nozzle 28 is illustrated to show a spray of a combustive medium, or fuel mixture, 31, as well as ignition position(s) of the laser beam 14 within the combustion chamber 202. Depicted are laser arrangements wherein the nozzles 28 are configured in optical alignment with the laser light source 12, and capable of receiving an emitted laser beam 14. As previously described with regard to FIG. 1, an optical beam guidance component 16 is configured proximate an outer liner 204 of the combustion chamber 202.

Figure 2:
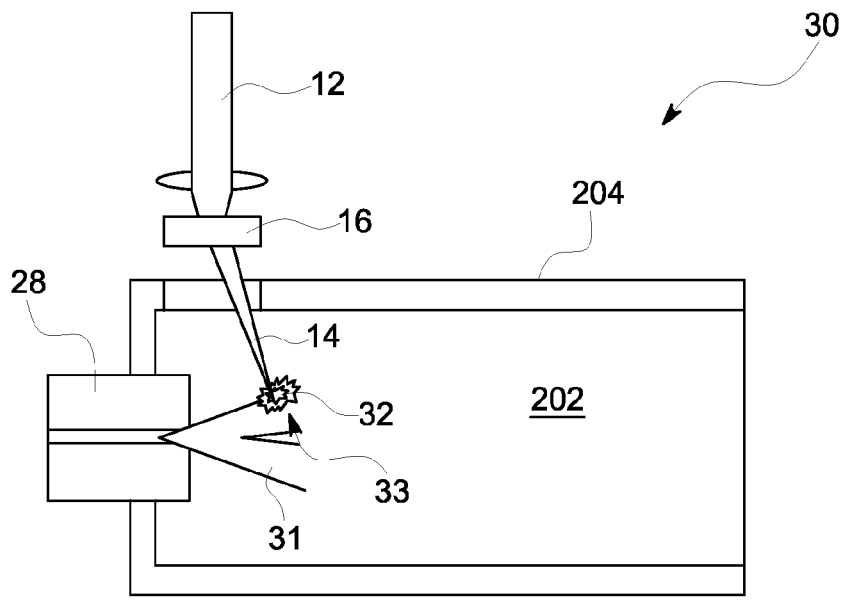
FIG. 2 is a schematic diagram of a laser ignition system in accordance with one embodiment.
Figure 3:
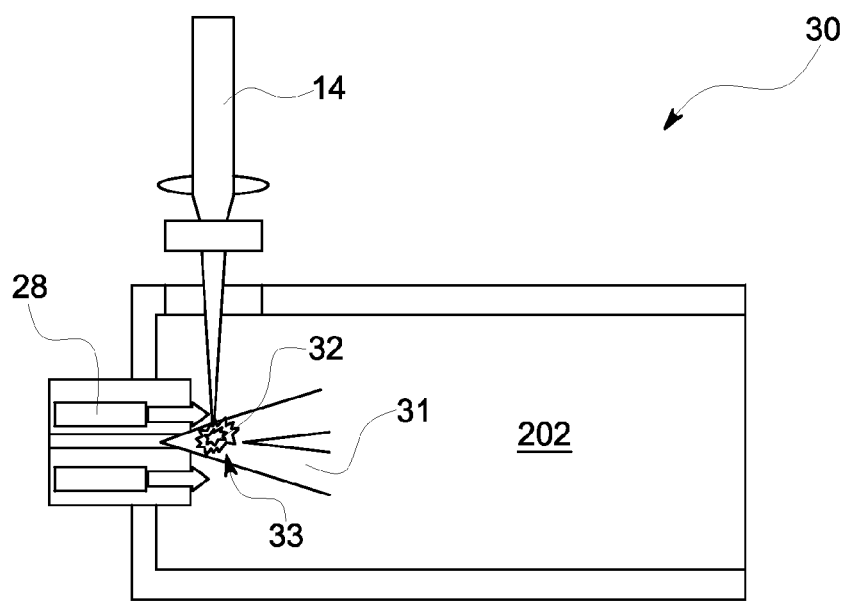
FIG. 3 is a schematic diagram of a laser ignition system in accordance with one embodiment.
Figure 4:
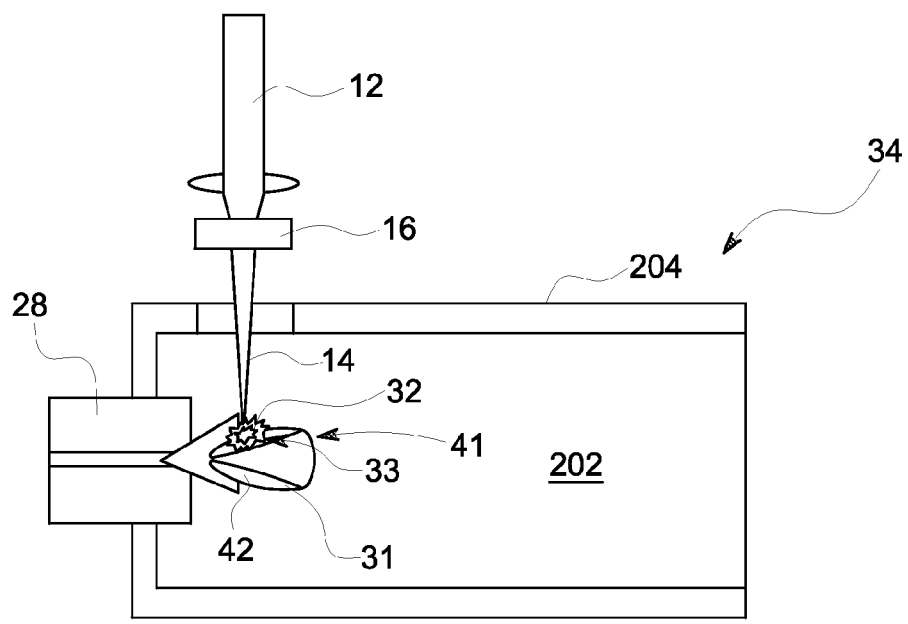
FIG. 4 is a schematic diagram of a laser ignition system in accordance with one embodiment.
Figure 5:
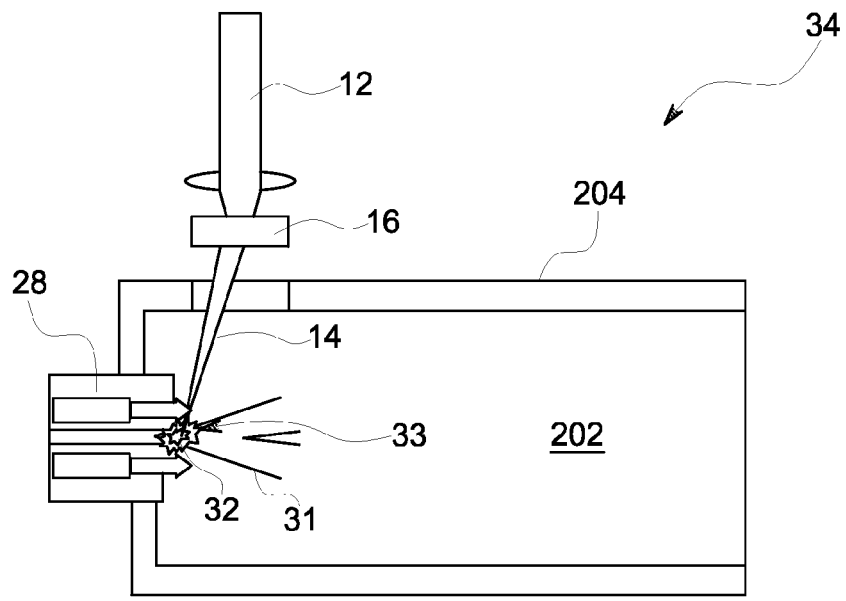
FIG. 5 is a schematic diagram of a laser ignition system in accordance with one embodiment.

To provide enhanced ignition, the laser beam 14 is transmitted to irradiate on the oxygenated fuel mixture, or combustive medium, 31 supplied into the combustion chamber 202, via a laser spark 32, at a region of highest ignitability 33 to generate a combustor flame in a flame region. As best illustrated in FIGS. 2 and 4, the laser beam 14 is directed by the optical beam guidance component 16 to generate the laser spark 32 in a location that corresponds to a region of highest ignitability 33 under normal operating conditions. During critical engine operating conditions, such as under inclement weather conditions, and as best illustrated in FIGS. 3 and 5, the laser beam 14 is directed by the optical beam guidance component 16 to generate the laser spark 32 in a region of highest ignitability 33 that is nearer a tip of the nozzle 28. When the laser beam 14 is directed to generate the laser spark 32 nearer the nozzle 28, it assists fuel atomization and pre-ionizes the oxygenated fuel mixture 31 to improve flame stability and prevent flame out events. The laser spark 32 location may vary for different fueling modes.

In one non-limiting example, during operation, the optics 17 housed within the optical beam guidance component 16 focuses and transmits the laser beam 14 towards the nozzle 28 to enter into the combustion chamber 202 and ignite the oxygenated fuel mixture 31 sprayed from the nozzle 28 at the desired location(s) of high ignitability 33. The optics 17 housed within the optical beam guidance component 16, may comprise diffractive components, moving prisms, moving mirrors, optoacoustic switches and/or polarization-based optics. More specifically, the optical beam guidance component may include a conventional lens, or any lens with high efficiency, and good focus that is suitable for relaying the laser beam 14 to ignite the combustive medium 31 at the region of highest ignitability 33 within the combustion chamber 202.

As previously stated, during critical operative conditions, the laser spark 32 may be directed to the region of highest ignitability 33. In the exemplary embodiment illustrated in FIG. 4, illustrated is the region of highest ignitability 33 being proximate a recirculation zone 41 inside the combustion chamber. More specifically, the region of highest ignitability 33 is proximate a shear layer 42 on a border of the recirculation zone 41 and close to the tip of the fuel nozzle 28. The volume of the laser spark 32 is generally comparable to the size of the exit cross-sectional area of the tip of the nozzle 28 and hence to the volume of the fuel injected. Due to the high energy density of the laser spark 32, the pilot fuel is substantially heated up close to the injection location. Moreover, the laser spark 32 may cause breakdown of the mixture in the vicinity of the tip of the nozzle 28 and generate shock waves that propagate radially. In the embodiments illustrated in FIGS. 2-5, by focusing the laser spark 32 to the region of highest ignitability 33, the viscosity of the fuel decreases, vaporization of the fuel increases, atomization of the fuel is supported by both the pre-heat and the interaction with the shock waves, and the fuel-to-air mixture is locally pre-ionized by the laser spark 32 and highly reactive radicals and ions are set free. The overall effect is of enhancing mixing and flame stability, which can prevent a blow-off event.

Figure 6:
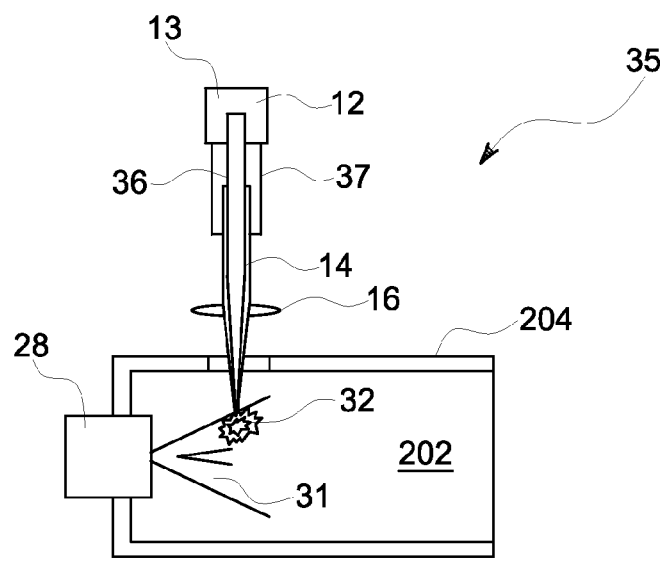
FIG. 6 is a schematic diagram of a laser ignition system in accordance with one embodiment.
Figure 7:
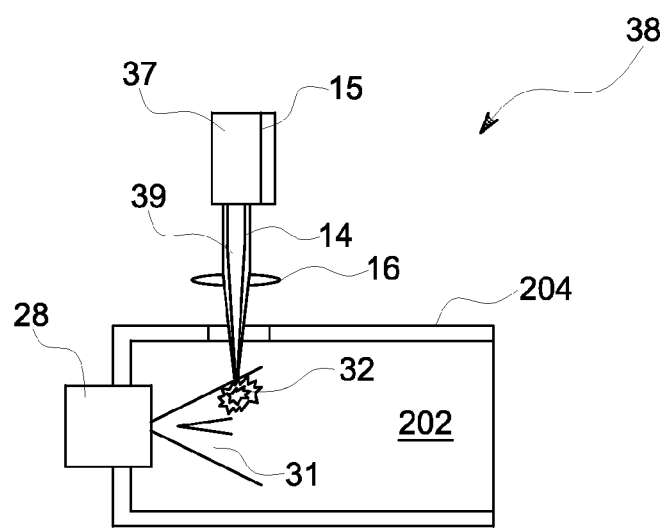
FIG. 7 is a schematic diagram of a laser ignition system in accordance with another embodiment.
Figure 8:
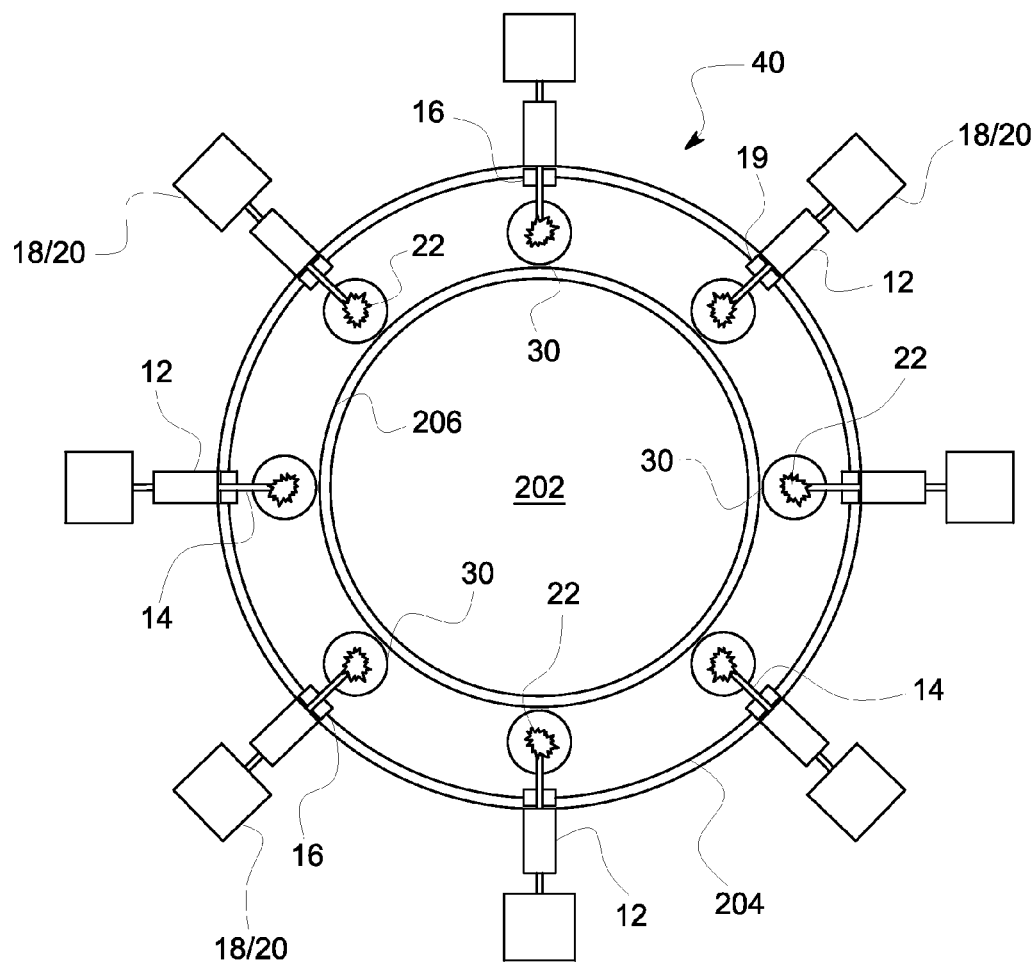
FIG. 8 is a graphical representation of a laser ignition system in accordance with another embodiment.
Figure 9:
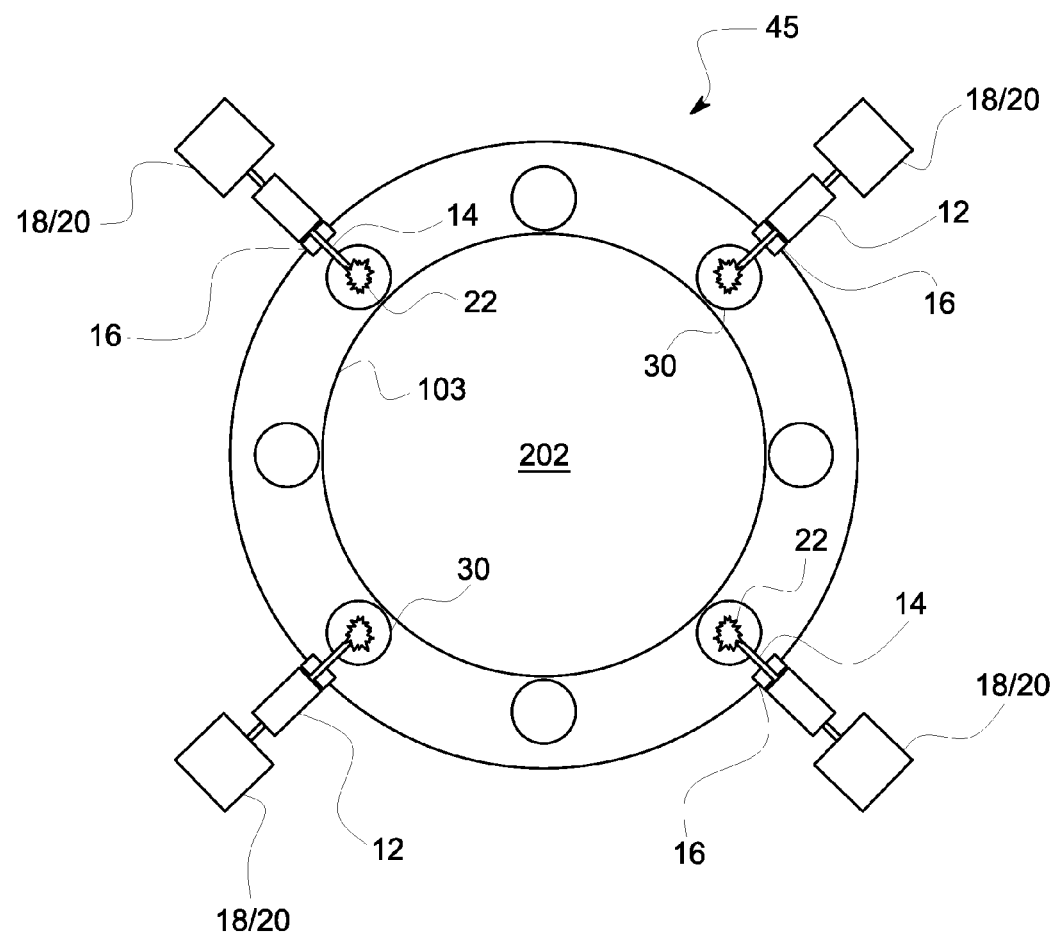
FIG. 9 is a schematic diagram of a laser ignition system in accordance with another embodiment.

Referring now to FIGS. 6 and 7, illustrated in schematic diagrams is a laser ignition system in accordance with embodiments. It should be noted that depicted arrangements in FIGS. 6 and 7 are merely illustrative. Illustrated in FIGS. 8 and 9 are laser ignition systems 40 and 45, respectively, configured generally similar to the laser ignition 10, described in reference to FIG. 1 and having pump light enhanced ignition.

In the depicted embodiments, provided are a plurality of fuel nozzles 28, of which only one is shown, in the internal combustion engine 200 (FIG. 1). The fuel nozzle 28 is illustrated to show a spray of the combustive mediums 31, as well as ignition position(s) of the laser beam 14 within the combustion chamber 202. Depicted are laser arrangements wherein the nozzles 28 are configured in optical alignment with the laser light source 12, and capable of receiving an emitted laser beam 14. As previously described with regard to FIG. 1, an optical beam guidance component 16 is configured proximate an outer liner 204 of the combustion chamber 202.

In the laser ignition system 35, illustrated in FIG. 6, the laser light source 12 is a laser diode pump source 13. During operation, a portion of the emitted light (near infrared pump laser light) 36 of the pump source 13 is extracted from a laser cavity 37 and guided into the combustion chamber 202 to support ignition instead of being lost as heat. By guiding this emitted light 36 into the combustion chamber 202, the required cooling requirements on the laser portion of the laser ignition system 35 is reduced.

In the laser ignition system 38, illustrated in FIG. 7, the laser light source 12 is a flash lamp pump source 15. During operation, a portion of the emitted light (light having a wavelength of up to 400 nm) 39 of the pump source 15 is extracted from a laser cavity 37 and guided into the combustion chamber 202 to support ignition instead of being lost as heat. By guiding this emitted light 39 into the combustion chamber 202, the required cooling requirements on the laser portion of the laser ignition system 38 is reduced.

Referring now to FIGS. 8-11, illustrated are embodiments of an optimized laser ignition system having integrally combined therewith a combustion diagnostics apparatus. Referring more specifically to FIG. 8, illustrated is a schematic diagram of a laser ignition system 40 in accordance with one embodiment. It should be noted that depicted arrangement in FIG. 8 is merely illustrative. The laser ignition system 40 is configured generally similar to the laser ignition system 10, described in reference to FIG. 1. In the depicted embodiment, a plurality of nozzles, or combustor cups, 30 in the internal combustion engine 200 are illustrated to show a spray of the combustive mediums, as well as ignition position(s) of the laser beam 14 within the combustion chamber 202. Depicted is a multi-laser arrangement wherein the plurality of nozzles 30 are each configured in optical alignment with a laser light source 12, each capable of receiving an emitted laser beam 14. As previously described with regard to FIG. 1, an optical beam guidance component 16 is configured proximate an outer liner 204 of the combustion chamber 202. An inner liner 206 as illustrated in FIG. 8 further defines the combustion chamber 202.

In this exemplary embodiment, the laser ignition system 40 further includes an ignition controller 18 and flame sensor and control diagnostics 20. In the illustrated arrangement, the ignition controller 18 and the flame sensor and control diagnostics 20 may be placed or mounted proximate to the combustion chamber 202 and formed as a single integrated component coupled to the at least one laser light source 12. Alternatively, the ignition controller 18 and the flame sensor and control diagnostics 20 may be formed as separate components. Furthermore, in yet another alternative embodiment the ignition controller 18 and the flame sensor and control diagnostics 20 may be formed integral with the at least one laser light source 12.

As illustrated in FIG. 8, the internal combustion engine 200, and more particularly the outer liner 204 defines a plurality of opening (not labeled). Each of a plurality of optical beam guidance components 16 comprises a housing 19 and required optics 17. Each housing 19 is accommodated into one of the plurality of openings with one end thereof, so that each of the housings 19 is held onto the combustion engine 200 and communicates with the combustion chamber 202. In certain applications, each of the optical beam guidance components 16 may comprise more than one lens, more than one prism, diffractive optics, optoacoustic switches, and/or other optics. The housings 19 may be of any shape suitable for holding the required optics 17.

In one non-limiting example, during operation, the optics housed within each of the optical beam guidance components 16 focuses and transmits the laser beam 14 towards their respective nozzle 30 to enter into the combustion chamber 202 and ignite the combustive medium sprayed from the nozzle 30 at desired location(s). For some arrangements, the optics 17 housed within the optical beam guidance components 16, may comprise a conventional lens, or any lens with high efficiency, and good focus that is suitable for relaying the laser beam 14 to ignite the combustive medium at ignition location(s) within the combustion chamber 202. Each of the optical beam guidance components 16 is additionally configured to include optics 17 for receiving light emissions from the flame 22, and subsequent detection by the flame sensor and control diagnostics 20.

During operation, the light emission from at least a portion of the flames 22 may pass through a respective optical beam guidance component 16 and may be focused, imaged, or transformed by the one or more optics 17 onto the at least one optical detector 27 housed within each of the flame sensor and control diagnostics component 20. The multi-laser arrangement depicted in FIG. 8 provides for individually controllable laser emissions and a means in which combustion parameters are measured for each of the individual laser beams 14 by selectively detecting spatial, temporal, and/or spectral light emissions from each of the combustor burner flames 24. According to embodiments of the invention, the measured combustion parameters may in turn be utilized to control various parameters of the internal combustion engine 200, including, but not limited to fuel flow rates of each individual nozzle 30, fuel/air ratios, and fuel flow distributions to optimize nitrous oxide emissions, dynamic pressure oscillations, and fuel efficiencies.

FIG. 9 is a schematic diagram of a laser ignition system 45 in accordance with another embodiment. It should be noted that depicted arrangement in FIG. 9 is merely illustrative. The laser ignition system 45 is configured generally similar to the laser ignition system 40, described in reference to FIG. 8, except in this exemplary embodiment, only a portion of the nozzles 30 are coupled to receive a laser beam 14 from a respective laser light source 12. More particularly, depicted in FIG. 9 is a multi-laser arrangement wherein a portion of the plurality of nozzles 30, also referred to as active nozzles, are each configured in optical alignment with an optical beam guidance component 16, a laser light source 12, and a flame sensor and control diagnostics 20. Each of the active nozzles 30 is capable of receiving an emitted laser beam 14 through its respective optical beam guidance component 16. In addition, each of the optical beam guidance components 16 is configured to include optics 17 for receiving and transmitting light emissions from a respective flame 22, for subsequent detection by the flame sensor and control diagnostics 20.

Figure 10:
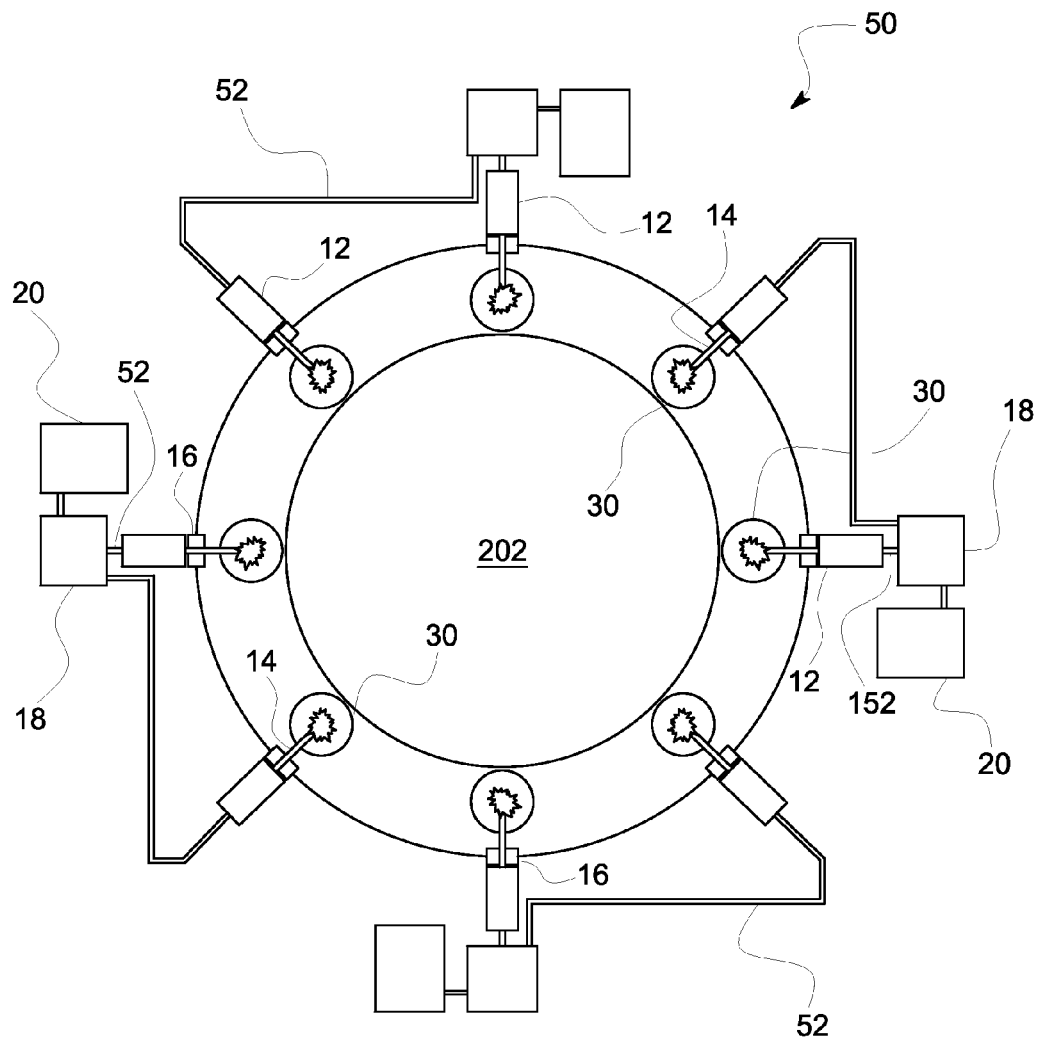
FIG. 10 is a schematic diagram of a laser ignition system in accordance with another embodiment.

FIG. 10 is a schematic diagram of a laser ignition system 50 in accordance with yet another embodiment of the invention. It should be noted that depicted arrangement in FIG. 10 is merely illustrative. The laser ignition system 50 is configured generally similar to the laser ignition system 40, described in reference to FIG. 8, except in this exemplary embodiment, a plurality of nozzles 30 are coupled to a ignition controller 18 and a flame sensor and control diagnostic component 20. More particularly, depicted in FIG. 10 is a multi-laser arrangement wherein each of the nozzles 30 is configured in optical alignment with an optical beam guidance component 16 and a laser light source 12. In contrast to the previous embodiments, a plurality of the nozzles 30 are coupled to a single flame sensor and control diagnostic component 20. Each of the nozzles 30 is capable of receiving an emitted laser beam 14 from a respective laser light source 12 and through a respective optical beam guidance component 16. In addition, each of the optical beam guidance components 16 is configured to include optics 17 for receiving and transmitting light emissions from a respective flame 22, for subsequent detection by a flame sensor and control diagnostics 20 via an electric power cable 52.

During operation, each of the optical beam guidance components 16 are configured to include optics 17 for transmitting and focusing the laser beam 14 toward the nozzle 30 to which it is coupled and for receiving light emissions from the flame 22, for subsequent detection by the flame sensor and control diagnostics 20 to which it is coupled. More specifically, during the diagnostic phase of operation, the light emission from at least a portion of the flames 22 may pass through the coupled optical beam guidance component 16 and may be focused, imaged, or transformed by the one or more optics 17 onto the at least one optical detector 27 housed within each of the ignition controller 18 and the flame sensor and control diagnostics component 20. The multi-laser arrangement depicted in FIG. 10 provides for individually controllable laser emissions and a means in which combustion parameters are measured for each of the individual laser beams 14 by selectively detecting spatial, temporal, and/or spectral light emissions from each of the combustor burner flames 22. According to embodiments of the invention, the measured combustion parameters may in turn be utilized to control various parameters of the internal combustion engine 200, including, but not limited to fuel flow rates of each individual nozzle 30, fuel/air ratios, and fuel flow distributions to optimize nitrous oxide emissions, dynamic pressure oscillations, and fuel efficiencies.

Figure 11:
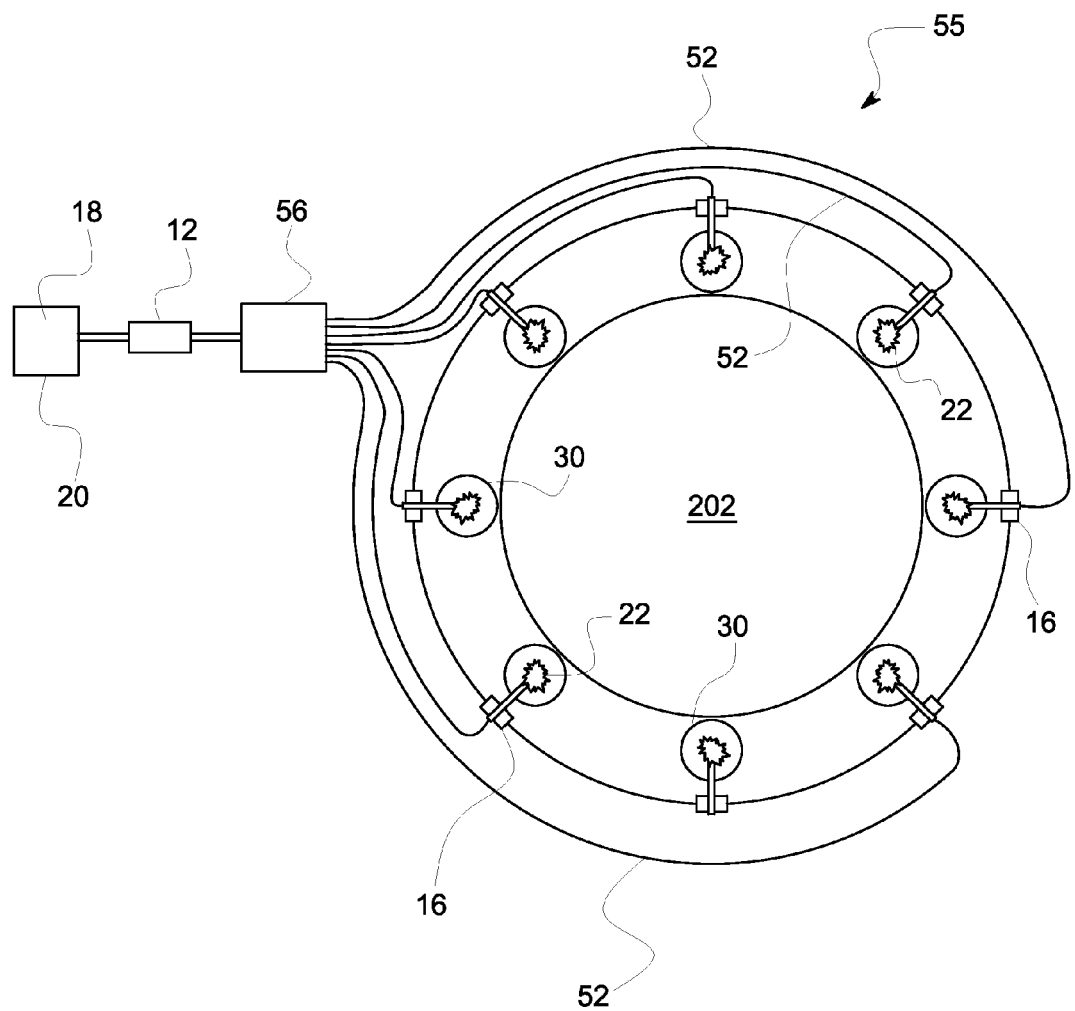
FIG. 11 is a schematic diagram of a laser ignition system in accordance with another embodiment.

FIG. 11 is a schematic diagram of a laser ignition system 55 in accordance with still another embodiment of the invention. It should be noted that depicted arrangement in FIG. 11 is merely illustrative. The laser ignition system 55 is configured generally similar to the laser ignition system 40, described in reference to FIG. 8, except in this exemplary embodiment, the nozzles 30 are coupled to a single ignition controller 18 and a single flame sensor and control diagnostic component 20. More particularly, depicted in FIG. 11 is a multi-laser arrangement wherein each of the nozzles 30 is configured in optical alignment with a respective optical beam guidance component 16. In contrast to the previous embodiments, a single laser light source 12 is coupled to each of the optical beam guidance components 16 and configured to emit a laser beam 14 to each respective nozzle 30. Furthermore, the nozzles 30 are coupled to a single flame sensor and control diagnostic component 20. In the illustrated arrangement, the flame sensor and control diagnostics 20 may be may be housed integral with the ignition controller 18 (as illustrated). Alternatively, the flame sensor and control diagnostic 20 may be placed or mounted adjacent to the combustion chamber 202 and formed separate from the ignition controller 18. Each of the nozzles 30 is capable of receiving an emitted laser beam 14 via a beam distribution unit 56 from the at least one laser light source 12 and through the respective optical beam guidance component 16. In addition, each of the optical beam guidance components 16 is configured to include optics 17 for receiving and transmitting light emissions from a respective flame 22, for subsequent detection by the flame sensor and control diagnostics 20 via an electric power cable 52.

During operation, each of the optical beam guidance components 16 are configured to include optics 17 for transmitting and focusing the laser beam 14 toward the nozzle 30 to which it is coupled and for receiving light emissions from the flame 22, for subsequent detection by the flame sensor and control diagnostics 20 to which it is coupled. More specifically, during the diagnostic phase of operation, the light emission from at least a portion of the flames 22 may pass through the coupled optical beam guidance component 16 and may be focused, imaged, or transformed by the one or more optics 17 onto the at least one optical detector 27 housed within the ignition controller 18 and the flame sensor and control diagnostics component 20. The multi-laser arrangement depicted in FIG. 11 provides for individually controllable laser emissions and a means in which combustion parameters are measured for each of the individual laser beams 14 by selectively detecting spatial, temporal, and/or spectral light emissions from each of the combustor burner flames 22. According to embodiments of the invention, the measured combustion parameters may in turn be utilized to control various parameters of the internal combustion engine 200, including, but not limited to fuel flow rates of each individual nozzle 30, fuel/air ratios, and fuel flow distributions to optimize nitrous oxide emissions, dynamic pressure oscillations, and fuel efficiencies.

In a typical laser system, the laser output is not conditioned, thus optimized, for ignition applications such as that disclosed in the previous laser ignition systems illustrated in FIGS. 2-11. In an attempt to develop more powerful, effective and flexible igniters for internal combustion engines, such as engine 200, laser pulse conditioning, including a laser pulse shape in both temporal and spatial domains, a sequence of pulses generated by the at least one laser light source 12 and an energy content of the laser beam 14 pulses must be addressed. Referring more specifically to FIGS. 12-16, illustrated are graphical diagrams describing such laser conditioning.

Figure 12:
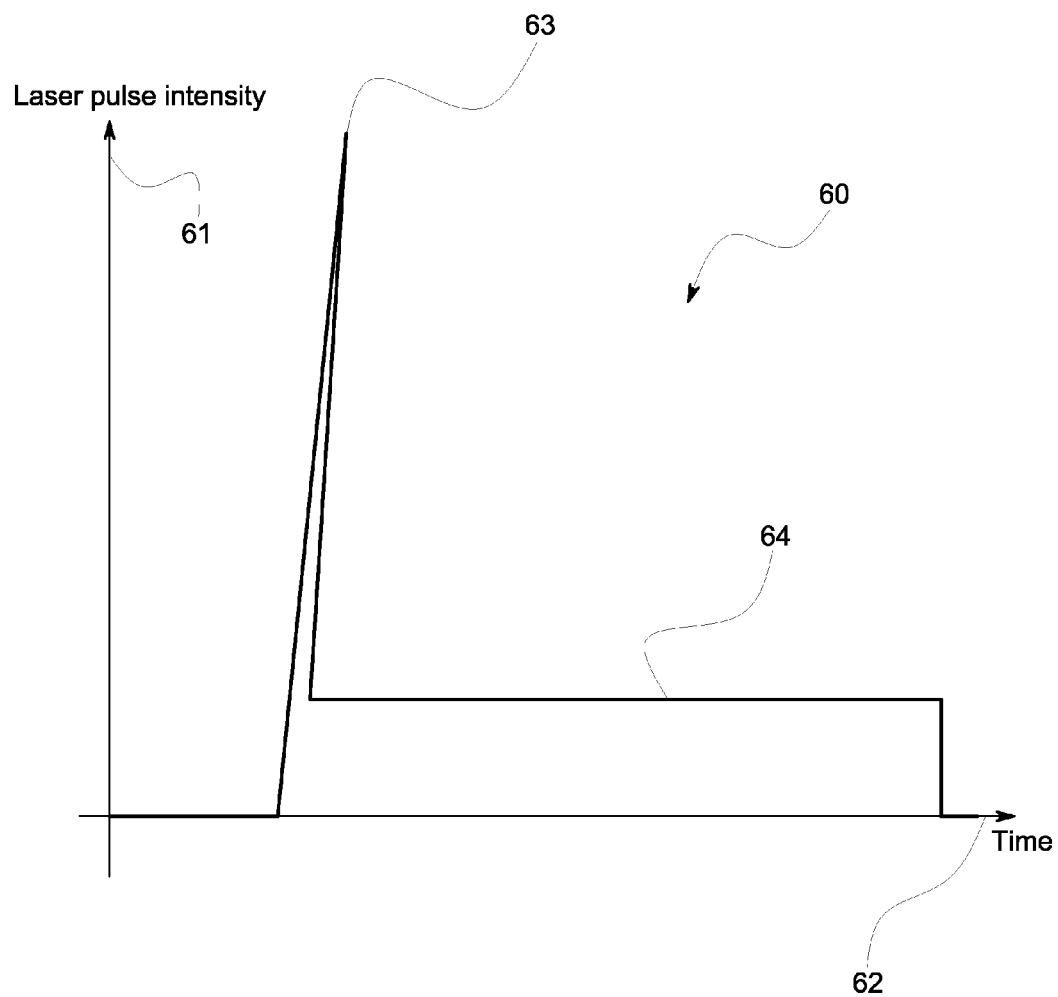
FIG. 12 is a graphical diagram of an optimized pulse shape of the laser ignition system in accordance with an embodiment.

Referring now to FIG. 12, illustrated in a graphical diagram 60 referenced by the laser pulse intensity 61 versus time 62, is an optimized pulse shape (time domain) for the laser ignition source, and more particularly laser beam 14, in accordance with an embodiment of the laser ignition system, such as system 10 (FIG. 1). In this exemplary embodiment, a laser igniter with an optimized time profile for the laser beam 14, as illustrated, is optimized to provide improved ignitability by generating an initial spark 63 with a short, high intensity peak and by subsequently, heating up the flame kernel with a long, low intensity tail 64 of the pulse.

Figure 13:
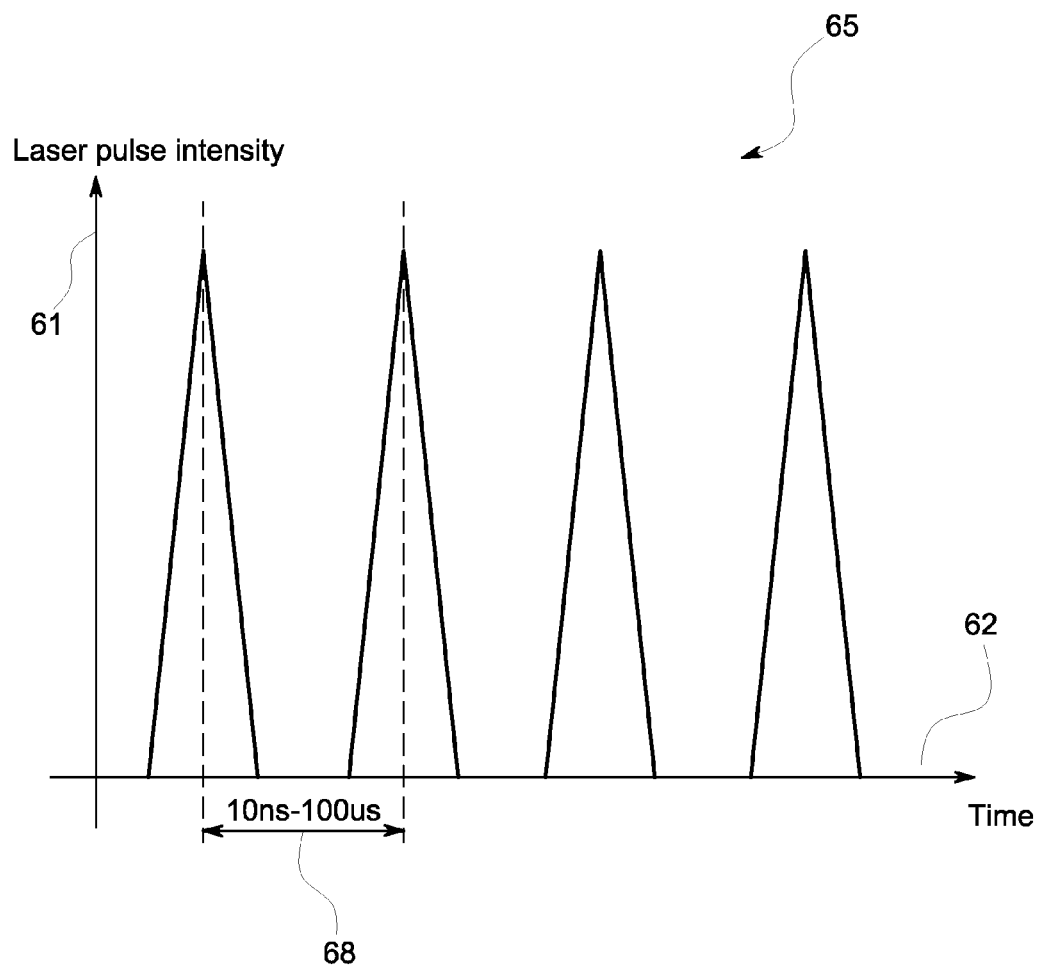
FIG. 13 is a graphical diagram of an optimized pulse train for enhanced energy transfer of the laser ignition system in accordance with an embodiment.

Referring now to FIG. 13, illustrated in a graphical diagram 65 referenced by the laser pulse intensity 61 versus time 62, and in accordance with an embodiment of the laser ignition system, such as system 10 (FIG. 1), is an optimized pulse sequence of a spark 66 for the laser beam 14. In an attempt to extend duration 68 of the spark 66 and enhance the energy transfer to the spark 66, and hence to the flame kernel, the pulse sequence of the spark 66 for ignition in the combustion chamber 202 is optimized as diagrammed. In this exemplary embodiment, the extended spark duration 68 enhances the energy transfer to the spark 66 and the associated flame kernel.

Figure 14:
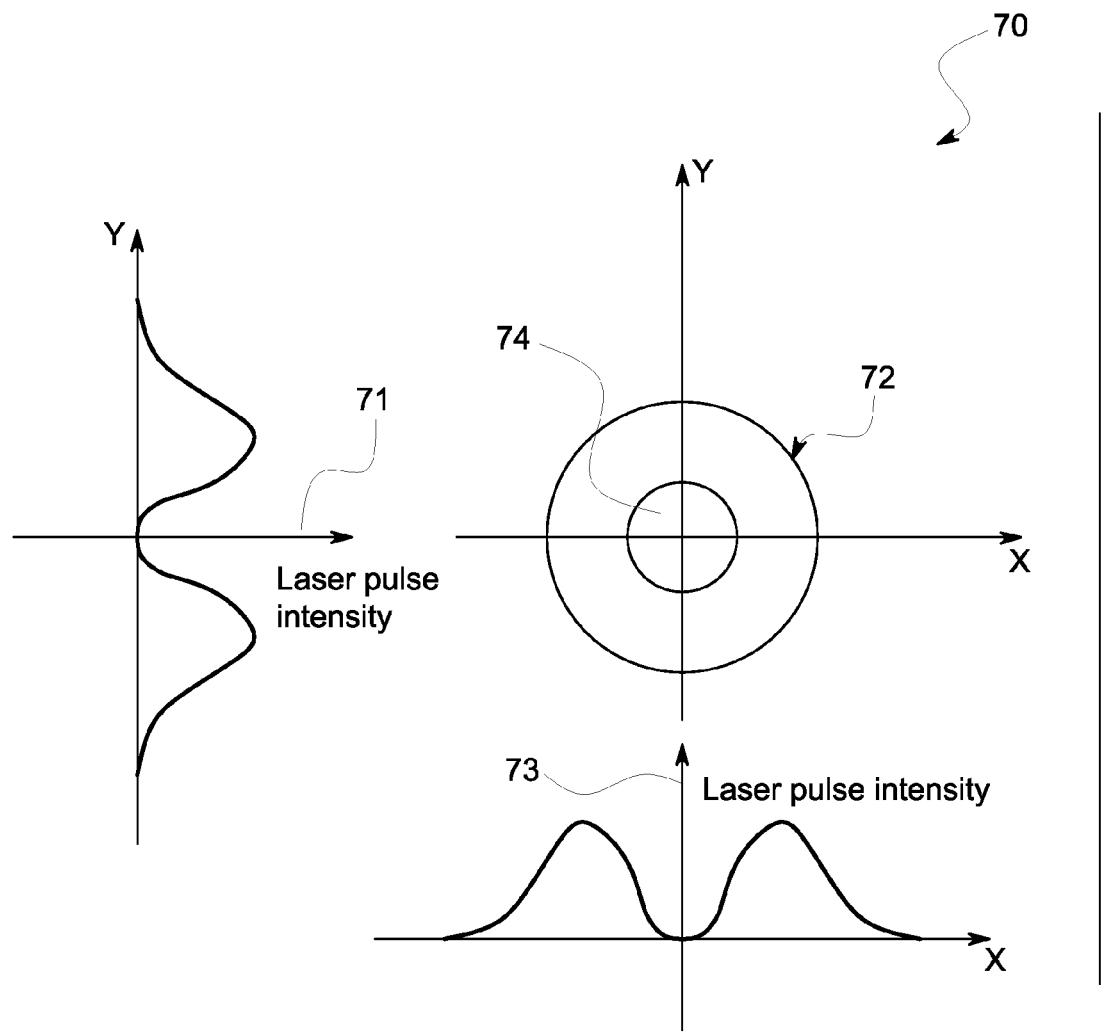
FIG. 14 is a graphical diagram of an optimized spatial pulse shape of the laser ignition system in accordance with an embodiment.

Referring now to FIG. 14, illustrated in a graphical diagram 70 in accordance with an embodiment of the laser ignition system, such as system 10 (FIG. 1), is a spatial laser beam profile (donut shape) 72 referenced by the laser pulse intensity 71 and 73. Typically, laser beam profiles of high power lasers are Guassian-like, meaning that the peak intensity is at the center of the laser beam, such as the laser beam 14. To optimize laser ignition, a donut-shaped profile, such as that of the spatial laser beam profile 72, provides an increase in ignitability by confining part of the fuel mixture in a central volume 74 surrounded by a ring of gas exposed to the laser energy. At each laser pulse, the gas in the ring is broken down and generates a spark, such as flame 22 (FIG. 1). The associated shock wave propagates radially in both positive and negative directions and compresses the gas confined in the central volume 74, thus leveraging the breakdown effect and generating a more powerful plasma. Therefore a laser light source, such as supply 12 (FIG. 1), producing a spatial laser beam donut profile 72, provides for an optimized ignition application.

Figure 15:
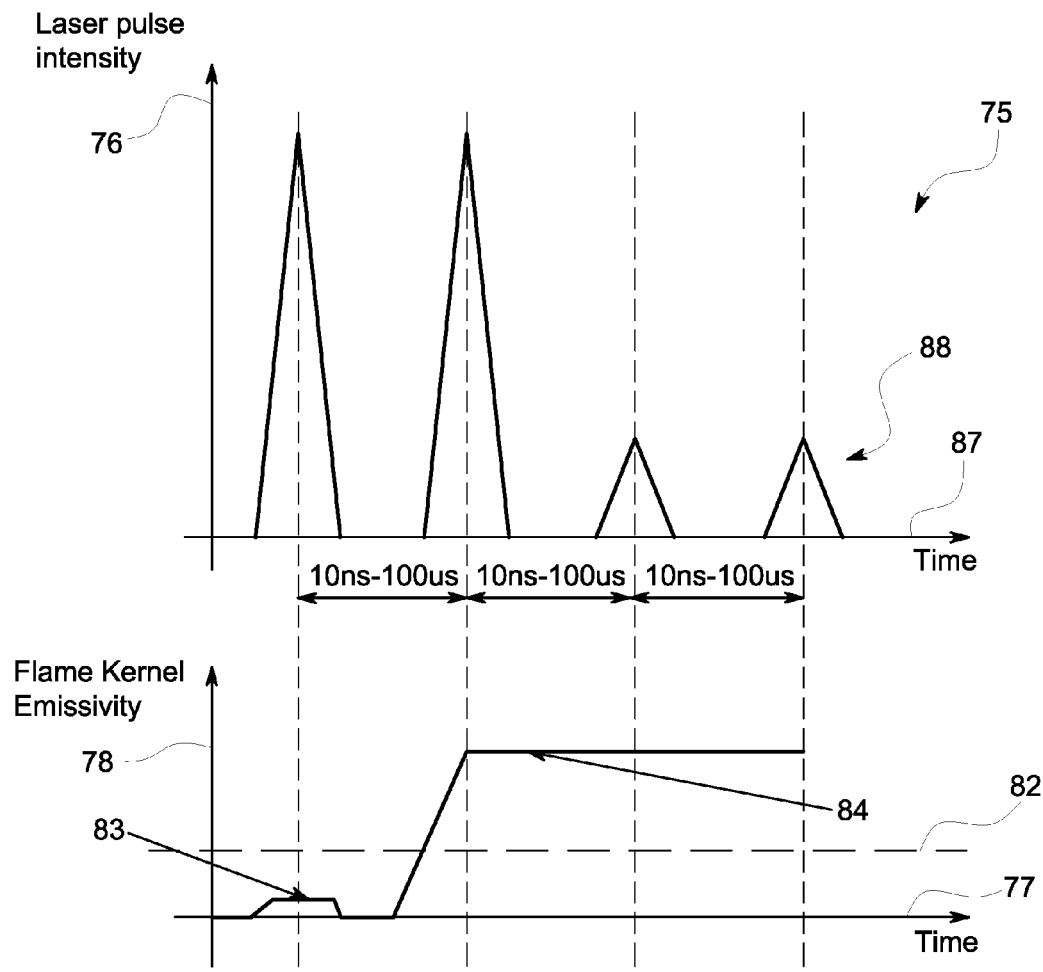
FIG. 15 is a graphical diagram of an optimized laser beam of the laser ignition system in accordance with an embodiment.

Referring now to FIG. 15, illustrated in a graphical diagram 75 referenced by a laser pulse intensity 76 versus time 77 and flame kernel emissivity 78 and time 77, and in accordance with an embodiment of the laser ignition system, such as system 10 (FIG. 1), is a variable laser pulse energy 80 including a closed loop ignition control. In an exemplary embodiment, in an attempt to optimize laser ignition, a closed loop system measures flame kernel emissivity 78 and may adapt the laser pulse energy from the at least one laser light source 12 (FIG. 1) to minimize the energy demand for reliable ignition. As illustrated in FIG. 15, during operation, detector 26 (FIG. 1) and the flame sensor and control diagnostics 20 (FIG. 1) detect and monitor the flame kernel emissivity 78 to determine if it has met a threshold value 82. FIG. 15 illustrates a failed event 83, where the detected flame kernel emissivity 78 failed to reach threshold value 82 and a successful event 84, where the detected flame kernel emissivity 78 successfully reached the threshold value 82. Optimizing the laser ignition, and more particularly flame kernel emissivity, may reduce the requirements on laser power and laser cooling and may reduce the maintenance intervals, ultimately extending the igniter lifetime. It also leads to smaller size for the ignition controller 18 (FIG. 1), flame sensor and control diagnostics 20 (FIG. 1) and power electronics.

Figure 16:
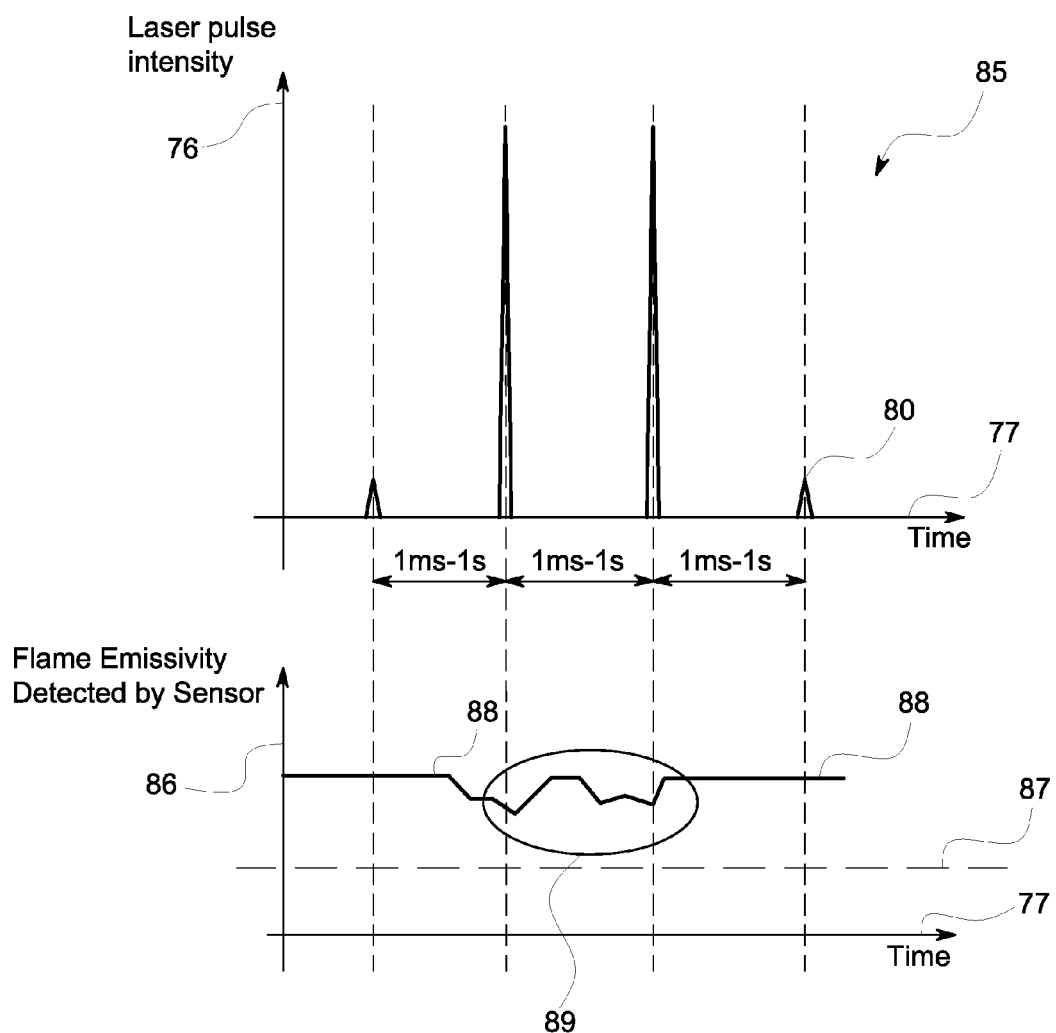
FIG. 16 is a graphical diagram of an optimized laser beam of the laser ignition system in accordance with an embodiment.

In addition, as best illustrated in FIG. 16 in a graphical diagram 85 referenced by a laser pulse intensity 76 versus time 77 and flame emissivity 86 and time 77, and in accordance with an embodiment of the laser ignition system, such as system 10 (FIG. 1), is the variable laser pulse energy 80 including a closed loop ignition control. In addition to measuring the flame kernel emissivity 78, as described with regard to FIG. 15, the closed loop system measures flame emissivity 86 and may adapt the laser pulse energy from the at least one laser light source 12 (FIG. 1) to minimize the energy demand for sustaining the flame leg (e.g. during inclement weather conditions). As illustrated in FIG. 16, during operations, detector 26 (FIG. 1) and the flame sensor and control diagnostics 20 (FIG. 1) may detect and monitor the flame emissivity 86 to determine if it has maintained a threshold value 87.

FIG. 16 illustrates flame stability 88, where the detected flame emissivity 88 is stable, maintaining the threshold value 87 and flame instability 89, where the detected flame emissivity 86 is not stable and fails to maintain the threshold value 87. Optimizing laser ignition, and more particularly flame emissivity, may reduce the requirements on laser power and laser cooling and may reduce the maintenance intervals, ultimately extending the igniter lifetime. It also leads to smaller size for the ignition controller 18 (FIG. 1), flame sensor and control diagnostics 20 (FIG. 1) and power electronics.

Accordingly, described is a laser ignition system and method for an internal combustion engine, and more particularly a gas turbine engine, in which, amongst other things, an optical beam guidance component is utilized to perform dual roles for both laser ignition at a point of highest ignitability and combustion diagnostics. In addition, disclosed is a laser ignition system in which optimization of the laser beam is provided. The disclosed integrated system may provide for lower NO* emission, improved reliability and ignitability, shorter response time to flame outs in the form of immediate relight capabilities, and improved combustion control, thus flame stability, at very lean conditions.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the subsequent claims.

What is claimed is:

1. A laser ignition system for an internal combustion engine including a combustion chamber, the laser ignition system comprising:
   at least one laser light source configured to generate a laser beam, wherein the laser beam is transmitted along a path extending from the at least one laser light source directly to the combustion chamber; and
   an optical beam guidance component configured to transmit the laser beam to irradiate on an oxygenated fuel mixture supplied into the combustion chamber at a region of highest ignitability to generate a combustor flame in a flame region, wherein the optical beam guidance component is configured to provide mechanical alignment of the at least one laser light source and an ignition port formed in a combustor wall of the combustor chamber and to cooperatively transmit a light emission from the combustor flame along a same path as the laser beam; and
   a flame sensor and control diagnostic component housed integral with the at least one laser light source and configured to detect at least a portion of the light emission and operable to control one or more combustion parameters based in part on the detected light emission.

2. The laser ignition system of claim 1, wherein the optical beam guidance component is configured to guide the laser beam in a plurality of directions.

3. The laser ignition system of claim 1, wherein the optical beam guidance component includes one or more of a diffractive component, a prism, a mirror, an optoacoustic switch, and a polarization-based optics.

4. The laser ignition system of claim 1, wherein the region of highest ignitability is proximate a recirculation zone inside the combustion chamber.

5. The laser ignition system of claim 4, wherein the region of highest ignitability is proximate a shear layer on a border of the recirculation zone.

6. The laser ignition system of claim 1, wherein the laser light source includes a pump laser light source configured to emit a pump light, wherein a portion of the emitted pump light is extracted from a laser cavity and guided into the combustion chamber.

7. The laser ignition system of claim 6, wherein the portion of the emitted pump light that is extracted from the laser cavity is near infrared light.

8. The laser ignition system of claim 6, wherein the portion of the emitted pump light that is extracted from the laser cavity is light having a wavelength of up to 400 nm.

9. The laser ignition system of claim 1, wherein the combustion chamber further comprises a plurality of combustor cups, wherein at least a portion of the plurality of combustor cups are active.

10. The laser ignition system of claim 9, further comprising a plurality of optical beam guidance components and wherein each of the plurality of combustor cups is in optical alignment with one of the plurality of optical beam guidance components.

11. The laser ignition system of claim 10, further comprising a plurality of laser light sources and wherein each of the plurality of a laser light sources is coupled to one of the plurality of optical beam guidance components.

12. The laser ignition system of claim 10, further comprising a plurality of ignition controllers and wherein each of the plurality of a laser light sources is coupled to one of the plurality of ignition controllers.

13. The laser ignition system of claim 10, further comprising a plurality of ignition controllers and wherein each of a plurality of ignition controllers is coupled to two or more laser light sources.

14. The laser ignition system of claim 10, wherein each of the plurality of optical beam guidance components is coupled to a beam distribution unit, the at least one laser light source, an ignition controller and at least one flame sensor and control diagnostic component.

15. The laser ignition system of claim 1, wherein the at least one laser light source is configured to optimize a time profile of the at least one laser beam to generate an initial laser pulse spark having a short, high intensity peak and subsequently heating a generated flame kernel with a longer lower intensity tail of the laser beam pulse.

16. The laser ignition system of claim 1, wherein the at least one laser light source is configured to optimize a pulse train of the at least one laser beam to extend a duration of a laser pulse spark and enhance energy transfer to the laser pulse spark and an associated flame kernel.

17. The laser ignition system of claim 1, wherein the at least one laser light source is configured to optimize a spatial pulse shape of the at least one laser beam.

18. The laser ignition system of claim 1, further comprising a closed loop ignition control to measure flame kernel emissivity and flame emissivity to adapt the at least one laser light source to minimize energy demand.

19. The laser ignition system of claim 1, wherein the internal combustion engine is a turbine engine.

20. A method for igniting a fuel mixture in an internal combustion engine, the method comprising:
   generating at least one laser beam with at least one laser light source, wherein the laser beam is transmitted along a path extending from the at least one laser light source directly to a combustion chamber of the internal combustion engine;
   transmitting the at least one laser beam through at least one optical beam guidance component to focus the at least one laser beam on the fuel mixture supplied into the combustion chamber of the internal combustion engine at a region of highest ignitability, wherein the optical beam guidance component is configured to provide mechanical alignment of the at least one laser light source and an ignition port formed in a combustor wall of the combustion chamber and to cooperatively transmit a light emission from a combustor flame along a same path as the laser beam;
   igniting the fuel mixture with the focused laser beam to generate the combustor flame in a flame region;
   transmitting the light emission from the combustor flame through the optical beam guidance component;
   detecting at least a portion of the light emission from the combustor flame in a flame sensor and a control diagnostic component housed integral with the at least one laser light source; and controlling one or more combustion parameter based in part on the detected light emission.

21. The method of claim 20, wherein transmitting the laser beam through at least one optical beam guidance component includes one or more of a diffractive component, a prism, a mirror, an optoacoustic switch, and a polarization-based optics.

22. The method of claim 20, wherein a portion of the laser beam is extracted from a laser cavity and guided into the combustion chamber.

23. The method of claim 20, wherein the combustion chamber further comprises a plurality of combustor cups wherein each of the plurality of combustor cups is in optical alignment with an optical beam guidance component.

24. The method of claim 20, further comprising optimizing a time profile of the at least one laser beam to generate an initial laser pulse spark having a short, high intensity peak and subsequently heating a generated flame kernel with a longer lower intensity tail of the laser beam pulse.

25. The method of claim 20, further comprising optimizing a pulse train of the at least one laser beam to extend a duration of a laser pulse spark and enhance energy transfer to the laser pulse spark and an associated flame kernel.

26. The method of claim 20, optimizing a spatial pulse shape of the at least one laser beam.

27. The method of claim 20, further comprising adapting the at least one laser light source to minimize energy demand with a closed loop ignition control to measure flame kernel emissivity and flame emissivity.

28. The method of claim 20, wherein the internal combustion engine is a turbine engine.

* * * * *